United States Patent
Rusanovskyy

(10) Patent No.: US 10,462,464 B2
(45) Date of Patent: Oct. 29, 2019

(54) METHOD AND APPARATUS FOR ENCODING AND DECODING VIDEO SIGNAL USING ADAPTIVE SAMPLING

(71) Applicant: LG ELECTRONICS INC., Seoul (KR)

(72) Inventor: Dmytro Rusanovskyy, Santa Clara, CA (US)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 15/038,701

(22) PCT Filed: Nov. 24, 2014

(86) PCT No.: PCT/KR2014/011330
§ 371 (c)(1),
(2) Date: May 23, 2016

(87) PCT Pub. No.: WO2015/076634
PCT Pub. Date: May 28, 2015

(65) Prior Publication Data
US 2016/0286219 A1 Sep. 29, 2016

Related U.S. Application Data

(60) Provisional application No. 61/908,164, filed on Nov. 24, 2013.

(51) Int. Cl.
*H04N 11/02* (2006.01)
*H04N 19/132* (2014.01)
(Continued)

(52) U.S. Cl.
CPC ......... *H04N 19/132* (2014.11); *H04N 19/117* (2014.11); *H04N 19/157* (2014.11);
(Continued)

(58) Field of Classification Search
CPC .................................................. H04N 19/132
(Continued)

(56) References Cited

U.S. PATENT DOCUMENTS 5,877,771 A * 3/1999 Drebin .................. G06T 11/001
345/586
6,577,685 B1 * 6/2003 Bao ........................ H04L 7/0029
348/E5.108
(Continued)

FOREIGN PATENT DOCUMENTS

CN 102986219 A 3/2013
CN 103338363 A 10/2013
(Continued)

*Primary Examiner* — Leron Beck
(74) *Attorney, Agent, or Firm* — Dentons US LLP

(57) ABSTRACT

Disclosed herein is a method of performing a deblocking filtering on a video signal. The method may include determining an adaptive sampling rate or an adaptive sampling pattern based on the property information of a decoded picture and performing the deblocking filtering using samples to which the adaptive sampling rate or the adaptive sampling pattern has been applied. The property information of the decoded picture may include at least one of a block size and a picture parameter.

14 Claims, 5 Drawing Sheets

(51) Int. Cl.
  *H04N 19/86* (2014.01)
  *H04N 19/117* (2014.01)
  *H04N 19/157* (2014.01)
  *H04N 19/182* (2014.01)
  *H04N 19/82* (2014.01)

(52) U.S. Cl.
  CPC ........... *H04N 19/182* (2014.11); *H04N 19/82* (2014.11); *H04N 19/86* (2014.11)

(58) Field of Classification Search
  USPC .................................................... 375/240.02
  See application file for complete search history.

(56) References Cited

U.S. PATENT DOCUMENTS

| | | | | |
|---|---|---|---|---|
| 6,993,207 | B1* | 1/2006 | Slavin | G06T 3/4023 |
| | | | | 345/660 |
| 9,405,989 | B2* | 8/2016 | Ogawa | G06K 9/36 |
| 9,774,851 | B2* | 9/2017 | Narroschke | H04N 19/80 |
| 2006/0280268 | A1* | 12/2006 | Sobchak | H04B 1/30 |
| | | | | 375/349 |
| 2008/0260025 | A1* | 10/2008 | Wada | H04N 19/176 |
| | | | | 375/240.03 |
| 2009/0192805 | A1* | 7/2009 | Topchy | G10L 19/018 |
| | | | | 704/500 |
| 2012/0051407 | A1* | 3/2012 | Ji | H03H 17/0294 |
| | | | | 375/219 |
| 2012/0201274 | A1* | 8/2012 | Chivers | H04B 1/71637 |
| | | | | 375/130 |
| 2013/0028531 | A1 | 1/2013 | Sato | |
| 2013/0058401 | A1 | 3/2013 | Song et al. | |
| 2013/0188883 | A1* | 7/2013 | Gisquet | G06T 9/004 |
| | | | | 382/233 |
| 2015/0016550 | A1* | 1/2015 | Kim | H04N 19/80 |
| | | | | 375/240.29 |
| 2016/0286219 | A1* | 9/2016 | Rusanovskyy | H04N 19/117 |
| 2017/0006288 | A1* | 1/2017 | Boitard | G06T 5/002 |

FOREIGN PATENT DOCUMENTS

| | | |
|---|---|---|
| EP | 1659798 A2 | 5/2006 |
| KR | 10-2011-0125153 A | 11/2011 |
| KR | 1020120010097 A | 2/2012 |
| WO | 2012094750 A1 | 7/2012 |
| WO | 2013034649 A1 | 3/2013 |
| WO | 2013037254 A1 | 3/2013 |
| WO | 2013/064548 A2 | 5/2013 |
| WO | 2013/066133 A1 | 5/2013 |

* cited by examiner

【Figure 1】
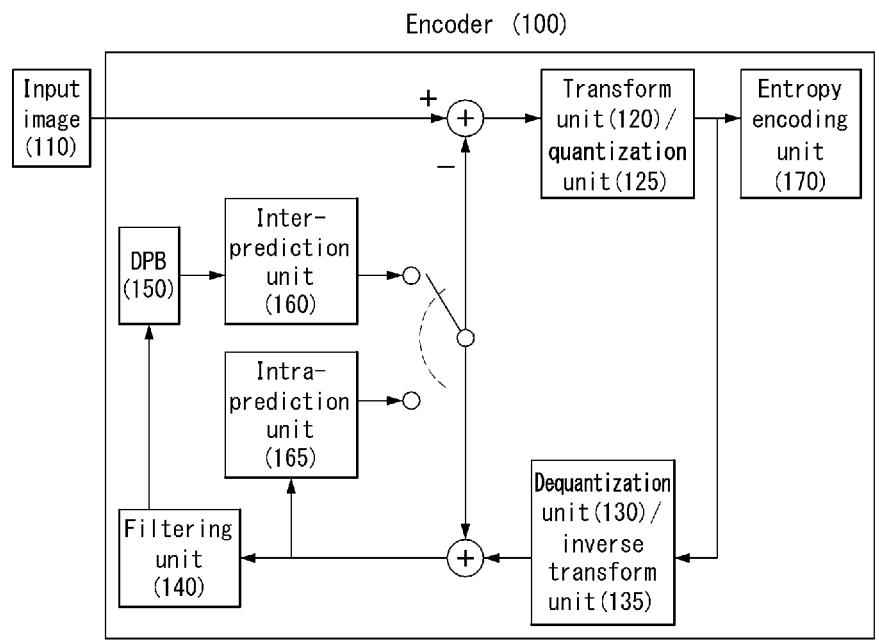
【Figure 2】
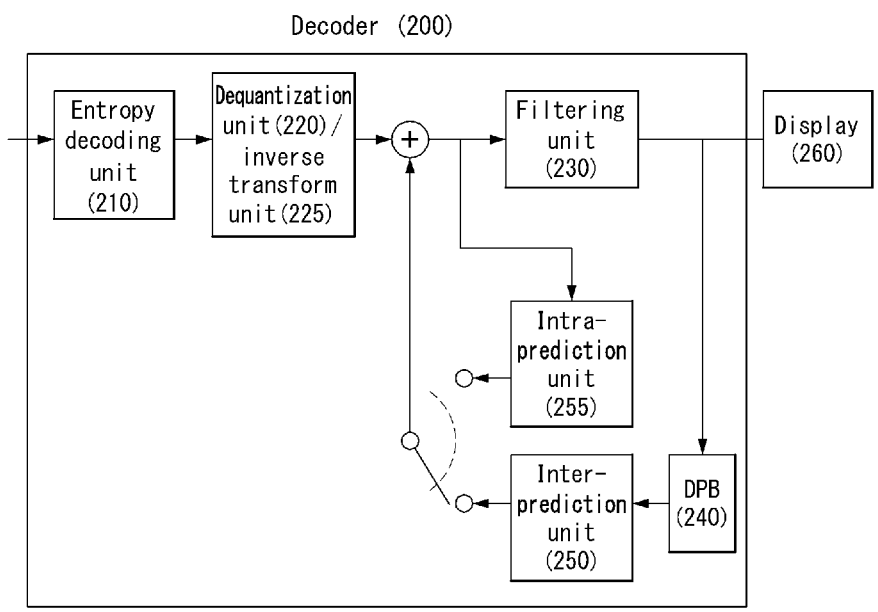

[Figure 3]
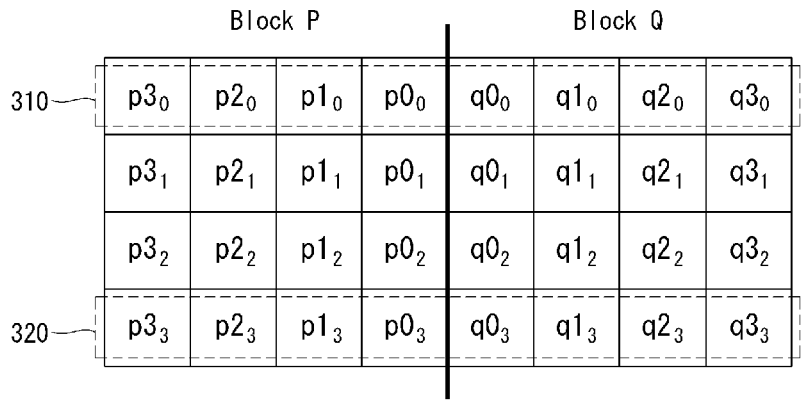
[Figure 4]
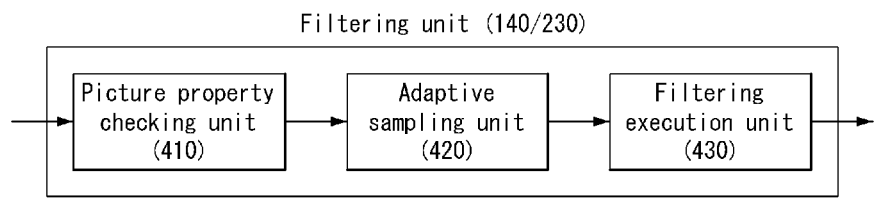
[Figure 5]
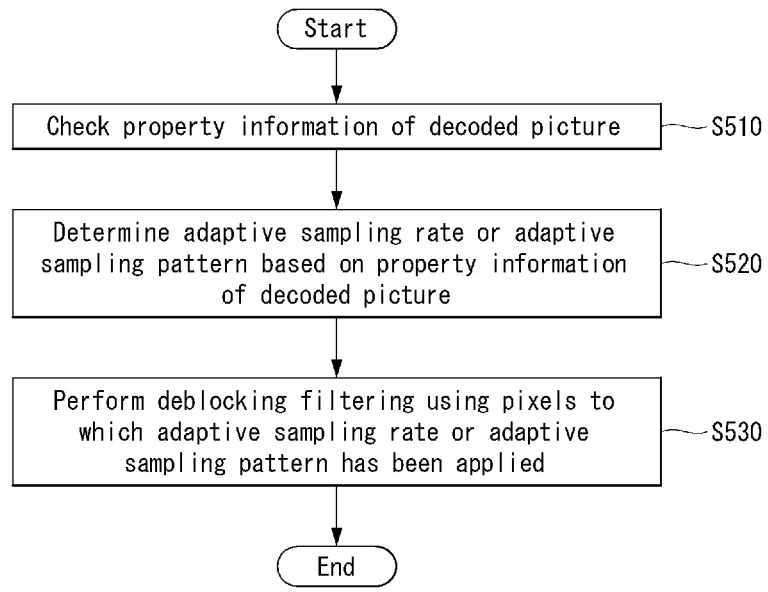

【Figure 6】
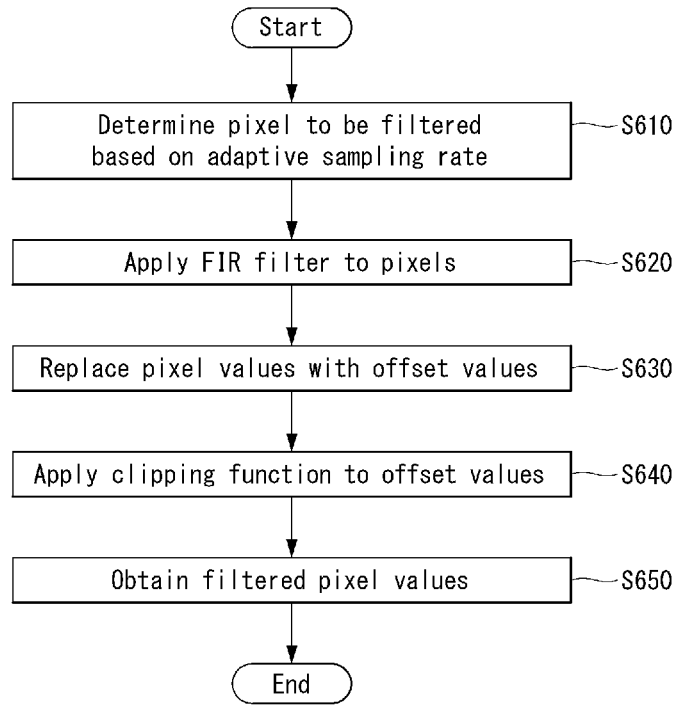
【Figure 7】
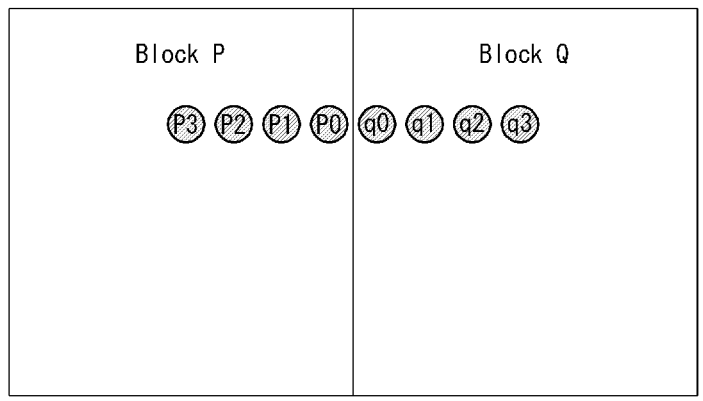

【Figure 8】
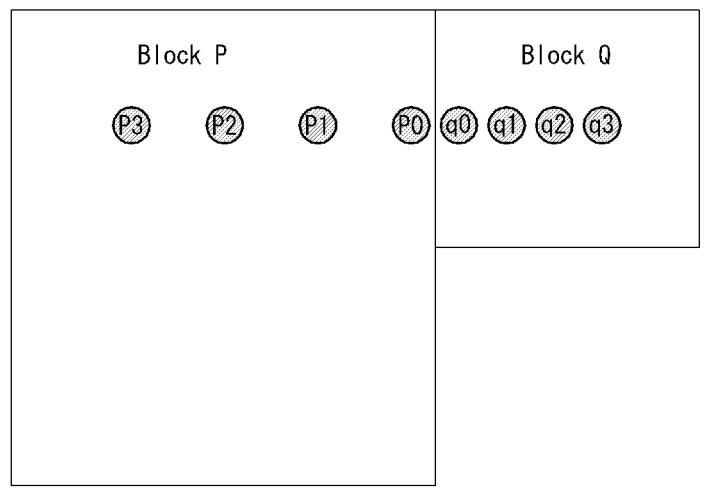
【Figure 9】
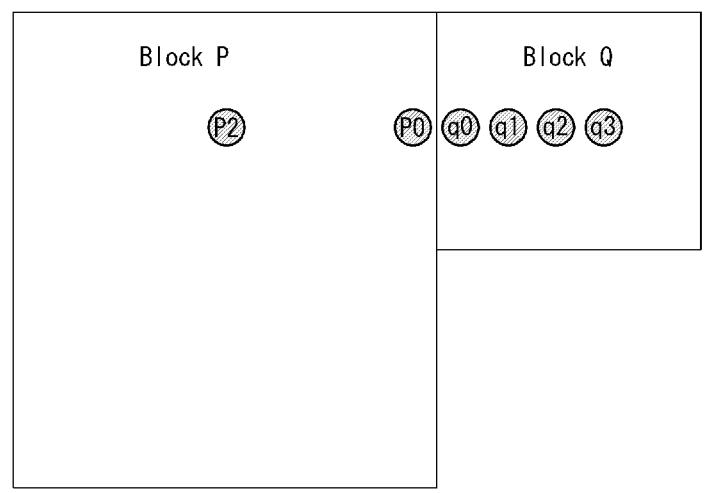

【Figure 10】
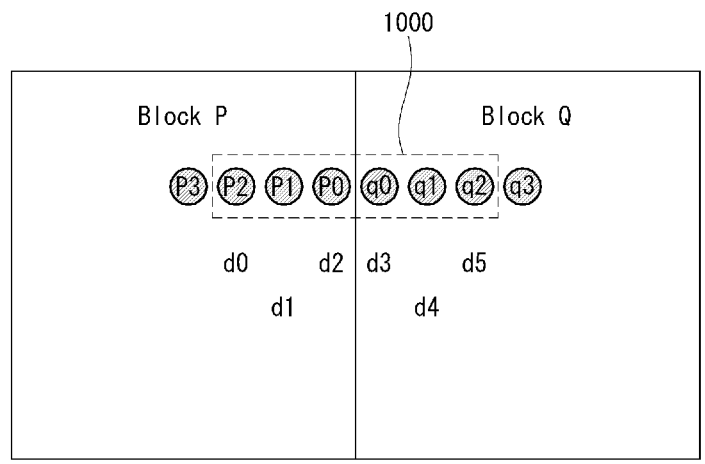
【Figure 11】
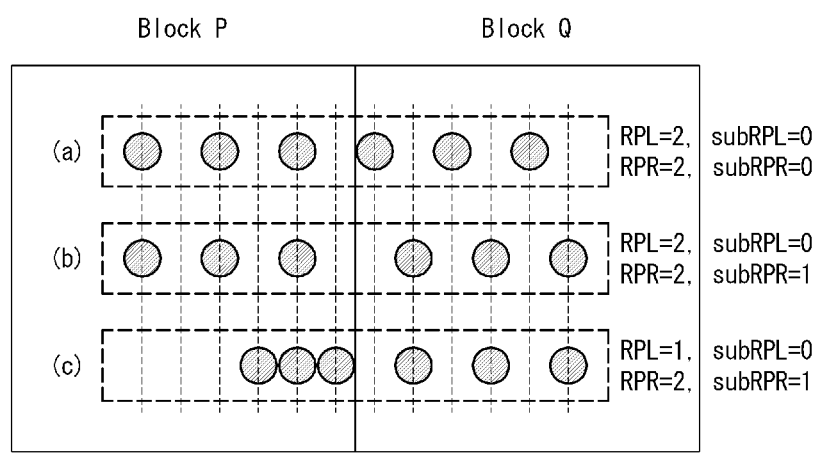

METHOD AND APPARATUS FOR ENCODING AND DECODING VIDEO SIGNAL USING ADAPTIVE SAMPLING

This application is a National Stage Application of International Application No. PCT/KR2014/011330, filed on Nov. 24, 2014, which claims the benefit of U.S. Provisional Application No. 61/908,164, filed on Nov. 24, 2013, all of which are hereby incorporated by reference in their entirety for all purposes as if fully set forth herein.

TECHNICAL FIELD

The present invention relates to a method and an apparatus for encoding and decoding a video signal using adaptive sampling and, more particularly, to an adaptive sampling method in an in-loop filtering process.

BACKGROUND ART

Compression coding means a series of signal processing technologies for sending digitalized information through a communication line or storing digitalized information in a form suitable for a storage medium. Media, such as video, an image, and voice, may be the subject of compression coding. In particular, a technology for performing compression coding on video is called video compression.

The next-generation video content expects to feature high spatial resolution, a high frame rate, and high dimensionality of a video scene representation. The processing of such content would require a significant increase in memory storage, a memory access rate, and processing power.

Accordingly, it is desirable to design a coding tool which address these foreseen challenges and offer some solutions. In particular, in existing video coding methods, in the case of deblocking filtering, the estimation of filter parameters is not adaptive to picture properties and all pixels of the decoded picture are used in a fixed manner. Accordingly, there is a need for a more efficient sampling method in a deblocking filtering process.

DISCLOSURE

Technical Problem

An object of the present invention is to propose a method of enabling a coding tool for high efficiency compression to be designed and reducing required computation resources.

Furthermore, the present invention proposes a locally adaptive sampling method in video signal coding.

Furthermore, the present invention proposes a method of applying locally adaptive sampling to the in-loop filtering stage of a video signal.

Furthermore, the present invention proposes a method of applying an adaptive sampling rate to the samples of a decoded picture placed at a block boundary.

Furthermore, the present invention proposes a method of determining an adaptive sampling rate based on the features (e.g., a block size and a picture parameter) of a coded picture.

The technical problems solved by the present invention are not limited to the above technical problems and those skilled in the art may understand other technical problems from the following description.

Technical Solution

The present invention provides a locally adaptive sampling method in video signal coding.

Furthermore, the present invention provides a method of applying locally adaptive sampling in the in-loop filtering stage of a video signal.

Furthermore, the present invention provides a method of determining an adaptive sampling rate or an adaptive sampling pattern based on the property information of a decoded picture.

Furthermore, the present invention provides a method of performing a deblocking filtering using samples to which the adaptive sampling rate or the adaptive sampling pattern has been applied.

Furthermore, the present invention provides a method of identically applying the adaptive sampling rate or the adaptive sampling pattern to a left block and a right block if the size of the left block is the same as that of the right block on the basis of a block boundary.

Furthermore, the present invention provides a method of differently applying the adaptive sampling rate or the adaptive sampling pattern to a left block and a right block if the size of the left block is different from that of the right block on the basis of a block boundary.

Furthermore, the present invention provides a method of applying the adaptive sampling rate or the adaptive sampling pattern to a block having a larger size with a low frequency sampling or a reduced sampling.

Furthermore, the present invention provides a method of applying the adaptive sampling rate by scaling an offset value with a rate conversion value.

Furthermore, the present invention provides a method of differently applying the rate conversion value to a left block and a right block on the basis of a block boundary.

Furthermore, the present invention provides a method of additionally adjusting the location of the samples based on a sub-rate conversion offset value.

Advantageous Effects

The present invention can enable the design of a coding tool for high efficiency compression and can also significantly reduce required computation resources, memory requirements, a memory access bandwidth, and computation complexity by proposing a locally adaptive sampling method.

Furthermore, a compression tool having a higher coding gain can be designed by removing redundancy and noise in determining a sample value.

DESCRIPTION OF DRAWINGS

FIG. 1 is a schematic block diagram of an encoder in which encoding is performed on a video signal in accordance with an embodiment to which the present invention is applied;

FIG. 2 is a schematic block diagram of a decoder in which decoding is performed on a video signal in accordance with an embodiment to which the present invention is applied;

FIG. 3 schematically illustrates location relationships between samples within a block used when filtering is performed in accordance with an embodiment to which the present invention is applied;

FIG. 4 is a schematic internal block diagram of a filtering unit for performing locally adaptive sampling in accordance with an embodiment to which the present invention is applied;

FIGS. 5 and 6 are embodiments to which the present invention is applied, wherein FIG. 5 is a flowchart illustrating a method of performing locally adaptive sampling and FIG. 6 is a flowchart illustrating a method of performing filtering using locally adaptive sampling.

FIGS. 7 to 9 are diagrams illustrating that an adaptive sampling rate is determined based on the property information of a decoded picture in accordance with embodiments to which the present invention is applied;

FIG. 10 is a diagram illustrating a method of performing filtering using locally adaptive sampling in accordance with an embodiment to which the present invention is applied; and FIG. 11 illustrates various examples in which a sampling is performed using a rate conversion value and a sub-rate conversion offset value in accordance with an embodiment to which the present invention is applied.

BEST MODE

The present invention provides a method of performing a deblocking filtering on a video signal, including adaptively determining an adaptive sampling rate or an adaptive sampling pattern based on the property information of a decoded picture and performing filtering using a pixel to which the adaptive sampling rate or the adaptive sampling pattern has been applied, wherein the property information of the decoded picture includes at least one of a block size and a picture parameter.

Furthermore, in an embodiment of the present invention, if the size of a left block is identical with the size of a right block based on a block boundary, the adaptive sampling rate or the adaptive sampling pattern is identically applied to the left block and the right block.

Furthermore, in an embodiment of the present invention, if the size of a left block is different from the size of a right block based on a block boundary, the adaptive sampling rate or the adaptive sampling pattern is differently applied to the left block and the right block, and low frequency sampling or reduced sampling is applied to a block having a larger size.

Furthermore, in an embodiment of the present invention, the pixel is addressed by a relative location for a left-most pixel of a right block based on a block boundary.

Furthermore, in an embodiment of the present invention, the adaptive sampling rate is applied by scaling an offset value with a rate conversion value.

Furthermore, in an embodiment of the present invention, the rate conversion value is differently applied to a left block and the right block based on the block boundary.

Furthermore, in an embodiment of the present invention, the location of the pixel is additionally adjusted based on a sub-rate conversion offset value.

Furthermore, in an embodiment of the present invention, a step of performing the deblocking filtering includes determining a pixel to be filtered based on the adaptive sampling rate or the adaptive sampling pattern, calculating an offset value by applying a finite impulse response (FIR) filter to the pixel, and obtaining the filtered pixel value by applying a clipping function to the offset value.

Furthermore, the present invention provides an apparatus for performing a deblocking filtering on a video signal, including a picture property checking unit configured to check the property information of a decoded picture, an adaptive sampling unit configured to determine an adaptive sampling rate or an adaptive sampling pattern based on the property information of the decoded picture, and a filtering execution unit configured to perform a deblocking filtering using a pixel to which the adaptive sampling rate or the adaptive sampling pattern has been applied, wherein the property information of the decoded picture includes at least one of a block size and a picture parameter.

Furthermore, in an embodiment of the present invention, the filtering execution unit is further configured to determine a pixel to be filtered based on the adaptive sampling rate or the adaptive sampling pattern, calculate an offset value by applying a finite impulse response (FIR) filter to the pixel, and obtain the filtered pixel value by applying a clipping function to the offset value.

MODE FOR INVENTION

Hereinafter, exemplary elements and operations in accordance with embodiments of the present invention are described with reference to the accompanying drawings. The elements and operations of the present invention that are described with reference to the drawings illustrate only embodiments, which do not limit the technical spirit of the present invention and core constructions and operations thereof.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analyses if other terms having similar meanings are present. For example, a signal, data, a sample, a picture, a frame, and a block may be properly replaced and interpreted in each coding process.

The present invention proposes a method using locally adaptive sampling in video coding. More specifically, the present invention proposes a method of applying locally adaptive sampling in the in-loop filtering stage in a transform-based hybrid video coding structure.

In accordance with an embodiment of the present invention, an adaptive sampling rate may be applied to the samples of a decoded picture placed at a block boundary, and the adaptive sampling rate may be determined from the property information (e.g., a block size and a picture parameter) of a coded picture.

Accordingly, the present invention can enable the design of a coding tool for high efficiency compression and can also reduce required computation resources (e.g., memory requirements, a memory access bandwidth, and computation complexity).

An example of adaptive sampling in video coding is as follows.

Skip mode may be interpreted as locally adaptive sampling in a time direction. Furthermore, in video coding, block partitioning may be interpreted as adaptive sampling for coding parameters, motion information, and coding mode.

Furthermore, when deblocking filtering is performed, some decision-making processes are performed at a block level without accessing sampling data. This may be interpreted as locally adaptive sampling for using coding parameters (e.g., motion information, coding mode, and a transform size) of a coded picture.

Furthermore, an adaptive resolution change at a sequence level may also be interpreted as locally adaptive sampling.

In some applications, a video encoder may select a resolution for representing video data which provides an optimal Rate-Distortion (RD) cost and performs video signal resampling prior to coding. For example, a side information signaling mechanism (e.g., SEI messages) may be utilized to specify decoder operations for resampling decoded video to the original resolution.

Furthermore, an adaptive resolution change at a picture level may also be interpreted as locally adaptive sampling. In some applications, a video encoder may select a resolution for representing a coded picture which provides an optimal RD cost and performs video signal resampling prior to coding. In such systems, a decoder would perform normative resampling/resolution normalization for every specific picture before placing it in a DPB unit or in a reference picture list. Scalable video coding systems may be examples of such systems. The next-generation video content is likely to feature high spatial-resolution and high dimensionality of scene representation. The processing of such video content would require a significant increase in memory storage, a memory access rate, and processing power.

In contrast, such a high sampling rate may lead to a problem of the oversampling of certain content. For example, video may be represented with a lower sampling rate without a loss in the quality of reconstructed data. Moreover, the application of complex models to very simple signals may lead to a noise component, processing artifacts, and a loss of compression efficiency.

Accordingly, in order to allow the next-generation video applications to have a reasonable computation cost, video coding systems may be designed to use multi-rate signal processing.

For example, a multi-rate signal processing method may use sampling rate conversion. The method may be applied to systems having different input and output sample rates.

The sampling rate conversion may be used to solve a complicated multi-variable optimization problem, but in video signals, such an approach may be not desirable due to a spatio-temporally varying complexity.

Accordingly, the use of locally adaptive sampling rates when video content is processed may allow for a significant reduction in required computational resources and lead to the design of more efficient compression tools.

For example, the adaptive partitioning of a coded picture may be used in non-overlapping picture fragments (or blocks). In such adaptive partitioning, a basis analysis of coded video data is performed and the sampling of coding mode is selected. For example, large block sizes may be used to code low complexity signals, and small block sizes may be used to code high complexity signals.

Furthermore, in most video coding tools (e.g., MC prediction, transform, and signaling), partitioning of other block sizes may be defined. The blocks may be accompanied by respective coding parameters (i.e., parameters of motion model, such as motion vector mv and index of reference picture used for prediction, refidx).

However, most coding tools, including interpolation, in-loop filtering (e.g., deblocking and a Sample-Adaptive Offset (SAO), and intra-prediction mode, are not affected by a selected partition size and thus do not benefit from the available estimates of local signal complexity of a coded signal.

Accordingly, the present invention proposes a method using locally adaptive sampling in video coding. More specifically, embodiments in which locally adaptive sampling is applied in an in-loop filtering stage are described below.

FIG. 1 is a schematic block diagram of an encoder in which encoding is performed on a video signal in accordance with an embodiment to which the present invention is applied.

Referring to FIG. 1, the encoder 100 includes a transform unit 120, a quantization unit 125, a dequantization unit 130, an inverse transform unit 135, a filtering unit 140, a Decoded Picture Buffer (DPB) unit 150, an inter-prediction unit 160, an intra-prediction unit 165, and an entropy encoding unit 170.

The encoder 100 receives an input video signal and generates a residual signal by subtracting a prediction signal, output by the inter-prediction unit 160 or the intra-prediction unit 165, from the input video signal. The generated residual signal is sent to the transform unit 120, and the transform unit 120 generates a transform coefficient by applying a transform scheme to the residual signal.

The quantization unit 125 quantizes the generated transform coefficient and sends the quantized coefficient to the entropy encoding unit 170. The entropy encoding unit 170 performs entropy coding on the quantized signal and outputs the resulting signal.

The quantized signal output by the quantization unit 120 may be used to generate the prediction signal. For example, the residual signal may be reconstructed by applying dequantization and inverse transform to the quantized signal through the dequantization unit 130 and the inverse transform unit 135 within the loop. A reconstructed signal may be generated by adding the reconstructed residual signal to the prediction signal output by the inter-prediction unit 160 or the intra-prediction unit 165.

Meanwhile, artifacts in which a block boundary appears may be generated because neighboring blocks are quantized by different quantization parameters in such a compression process. Such a phenomenon is called blocking artifacts, which is one of important factors on which people evaluate picture quality. In order to reduce such artifacts, a filtering process may be performed. Such blocking artifacts can be removed and an error of a current frame can be reduced through such a filtering process, thereby being capable of improving picture quality.

The filtering chiefly includes in-loop filtering and post filtering. The post filtering may be optionally used by a display device or a user without affecting a video decoding process, and thus a detailed description thereof is omitted. The in-loop filtering is described in connection with the filtering unit 140. The filtering unit 140 may perform deblocking filtering or sample-adaptive offset filtering or may perform both the deblocking filtering and the sample-adaptive offset filtering.

The filtering unit 140 applies filtering to the reconstructed signal and outputs the filtered signal to a playback device or sends the filtered signal to the DPB unit 150. The filtered signal sent to the DPB unit 150 may be used as a reference frame in the inter-prediction unit 160. Both picture quality and coding efficiency can be improved using the filtered frame as a reference frame in inter-prediction mode as described above. In this case, a filtering computation process is complicated, and frequent memory access is caused because the filtering unit 140 has to load reconstructed samples stored in memory and to store the filtered samples in the memory again in order to perform filtering. As a result, the complexity of a decoder is increased. Accordingly, in an embodiment of the present invention, a coding tool capable of reducing the complexity of the decoder is designed. More specifically, the present invention may lead to reduction in required computation resources by applying locally adaptive sampling in the filtering process.

The DPB unit 150 may store the filtered frame in order to use the filtered frame as a reference frame in the inter-prediction unit 160.

The inter-prediction unit 160 performs temporal prediction and/or spatial prediction with reference to a reconstructed picture in order to remove temporal redundancy and/or spatial redundancy. The intra-prediction unit 165 predicts a current block with reference to samples around a block on which coding is to be performed.

The prediction signal generated by the inter-prediction unit 160 or the intra-prediction unit 165 may be used to generate the reconstructed signal or to generate the residual signal.

FIG. 2 is a schematic block diagram of a decoder in which decoding is performed on a video signal in accordance with an embodiment to which the present invention is applied.

Referring to FIG. 2, the decoder 200 includes an entropy decoding unit 210, a dequantization unit 220, an inverse transform unit 225, a filtering unit 230, a DPB unit 240, an inter-prediction unit 250, and an intra-prediction unit 255. Furthermore, a reconstructed signal output by the decoder 200 may be played back through a display 260.

The decoder 200 receives a signal output by the encoder 100 of FIG. 1. The received signal is subject to entropy decoding through the entropy decoding unit 210. The dequantization unit 220 obtains a transform coefficient from the entropy-decoded signal using quantization step size information. The inverse transform unit 225 obtains a residual signal by performing inverse transform on the transform coefficient. The reconstructed signal is generated by adding the obtained residual signal to a prediction signal output by the inter-prediction unit 250 or the intra-prediction unit 255.

The filtering unit 230 applies filtering to the reconstructed signal and outputs the filtered signal to a playback device or sends the filtered signal to the DPB unit 240. The filtered signal sent to the DPB unit 240 may be used as a reference frame in the inter-prediction unit 250. In this specification, embodiments illustrated in filtering unit 140 of the encoder may be likewise applied to the filtering unit 230 of the decoder.

FIG. 3 schematically illustrates location relationships between samples within a block used when filtering is performed in accordance with an embodiment to which the present invention is applied.

Deblocking filtering in video coding may be chiefly divided into an analysis stage and a filtering stage.

In the analysis stage, the coding artifacts of a decoded picture may be modeled through a parameter set that is related to a 1D representation of a finite tap-length and artifacts-feature estimation. For example, as illustrated in FIG. 3, four samples of each of a left block and a right block on the basis of the vertical boundary of the block may be used. Furthermore, determination in a sample data processing and artifacts modeling stage is performed based on a specific deblocking type and the parameter of a deblocking filter.

Blocking artifacts may occur in both a vertical edge and a horizontal edge. Thus, filtering may be first performed on a vertical edge that belongs to the block boundary of a picture that is now reconstructed in a horizontal direction, and filtering may be then performed on a horizontal edge that belongs to the block boundary of the picture that is now reconstructed. In this specification, embodiments in which filtering is horizontally performed on a vertical edge have been illustrated, but the embodiments may be likewise applied to the filtering of a horizontal edge. Order of such filtering is also not limited to the above examples.

Referring to FIG. 3, sample positions on the left side may be defined as p0, p1, p2, and p3, and sample positions on the right side may be defined as q0, q1, q2, and q3 on the basis of a vertical boundary. Furthermore, a sub-script denotes the row identifier of a sample. For example, the sample positions of a left block P in a first row may be defined as $p0_0$, $p1_0$, $p2_0$, and $p3_0$, and the sample positions of a right block Q may be defined as $q0_0$, $q1_0$, $q2_0$, and $q3_0$ (310). Likewise, the sample positions of the left block P in a fourth row may be defined as $p0_3$, $p1_3$, $p2_3$, and $p3_3$, and the sample positions of the right block Q may be defined as $q0_3$, $q1_3$, $q2_3$, and $q3_3$ (320).

The analysis stage is required to use various coding parameters, such as coding mode, a coded residual signal, motion information, and an actual sample at a block boundary.

The analysis stage can be considered as a complicated part of the deblocking filtering and requires access to various coding parameters such as coding modes (intra, or inter), coded residuals, motion information (motion vectors and reference index) as well as actual samples at the block boundary.

As some of such parameters are present at a block level, complexity of filtering would follow block partitioning used to code a current picture. An example of such processing may include the derivation of Boundary Strength (BS).

A less complex video signal would be represented with a larger block size and therefore less parameters to be fetched from memory and processed for deblocking. For example, simple content is likely to be coded with large blocks and complex content is likely to be coded with a large number of small blocks.

Accordingly, complexity of filtering can be reduced by applying locally adaptive sampling based on information about the partitioning and/or coding mode of each block rather than applying a fixed manner to all the blocks when filtering is performed.

FIG. 4 is a schematic internal block diagram of the filtering unit for performing locally adaptive sampling in accordance with an embodiment to which the present invention is applied.

The filtering unit 140, 230 includes a picture property checking unit 410, an adaptive sampling unit 420, and a filtering execution unit 430.

The filtering unit 140, 230 may first perform filtering on vertical edges for each macro block in a horizontal direction and then perform filtering on horizontal edges in a vertical direction. In some embodiments, the filtering unit 140, 230 may perform filtering on the vertical edges of all the block boundaries of a picture that is now reconstructed in a picture unit and perform filtering on all the horizontal edges of all the block boundaries of the picture, but the present invention is not limited thereto.

First, the picture property checking unit 410 may check the property information of a decoded picture. For example, the property information of the decoded picture may include a block size, a picture parameter, etc. The picture parameter may be information that is included in a bit stream and transmitted or may be information derived from by the decoder. However, the present invention is not limited thereto. For example, the property information of decoded data can be defined at different levels, e.g. SPS (Sequence Parameter Set), PPS (Picture Parameter Set), slice or LCU (Largest Coding Unit), etc. Accordingly, an adaptive sampling rate and/or an adaptive sampling pattern can be determined based on parameters being signaled or derived at different levels.

The adaptive sampling unit 420 may determine an adaptive sampling rate and/or an adaptive sampling pattern based on the property information received from the picture property checking unit 410.

For example, the adaptive sampling unit 420 may determine an adaptive sampling rate and/or an adaptive sampling pattern based on the size of a left block and the size of a right block on the basis of a block boundary. For example, if the size of a left block is the same as that of a right block, the adaptive sampling unit 420 may identically apply the adaptive sampling rate and/or the adaptive sampling pattern to the left block and the right block.

For another example, if the size of the left block is different from that of the right block, the adaptive sampling unit 420 may differently apply the adaptive sampling rate and/or the adaptive sampling pattern to the left block and the right block. For example, the adaptive sampling unit 420 may apply low frequency sampling on a block having a larger block size or may apply reduced sampling on a block having a larger block size.

Meanwhile, a location of a sample to be filtered may be addressed by a relative location for the left-most pixel of a right block on the basis of a block boundary. Furthermore, the adaptive sampling rate may be determined by scaling an offset with a rate conversion value, and the rate conversion value may be differently applied to the left block and the right block on the basis of the block boundary.

Furthermore, the location of the sample to be filtered may be additionally adjusted based on a sub-rate conversion offset value.

The filtering execution unit 430 may perform filtering by applying an adaptive sampling rate and/or an adaptive sampling pattern determined by the adaptive sampling unit 420. That is, the filtering execution unit 430 may perform filtering using a sample to which the adaptive sampling rate and/or the adaptive sampling pattern has been applied.

FIGS. 5 and 6 are embodiments to which the present invention is applied, wherein FIG. 5 is a flowchart illustrating a method of performing locally adaptive sampling and FIG. 6 is a flowchart illustrating a method of performing filtering using locally adaptive sampling.

In an embodiment of the present invention, in order to determine whether or not to perform filtering, first, the property information of a decoded picture may be checked at step S510.

For example, the property information of the decoded picture may include at least one of a coding block size, a prediction block size, a transform block size, a partitioned block size, coding mode, and a coding parameter.

An adaptive sampling rate and/or an adaptive sampling pattern may be determined based on the checked property information of the decoded picture at step S520.

For example, the adaptive sampling rate and/or the adaptive sampling pattern may be determined based on the size of a left block and the size of a right block on the basis of a block boundary. If the size of the left block is the same as that of the right block, the adaptive sampling rate and/or the adaptive sampling pattern may be identically applied to the left block and the right block.

If the size of the left block is different from that of the right block, the adaptive sampling rate and/or the adaptive sampling pattern may be differently applied to the left block and the right block. For example, low frequency sampling may be applied to a block having a larger block size, or reduced sampling may be applied to a block having a larger block size.

After the adaptive sampling rate and/or the adaptive sampling pattern are determined as described above, filtering may be performed using a sample to which the adaptive sampling rate and/or the adaptive sampling pattern has been applied at step S530.

For example, referring to FIG. 6, when a sample to be filtered is determined by applying an adaptive sampling rate and/or an adaptive sampling pattern at step S610, an offset value may be calculated by applying a finite impulse response (FIR) filter to the sample at step S620. In this case, a sample value may be replaced with the calculated offset value at step S630.

Furthermore, the value of the filtered sample may be obtained at step S650 by applying a clipping function to the calculated offset value at step S640.

FIGS. 7 to 9 are diagrams illustrating that an adaptive sampling rate is determined based on the property information of a decoded picture in accordance with embodiments to which the present invention is applied.

The present invention proposes a local adaptive sampling method in a filtering stage. The local adaptive sampling method may be determined based on the property information of a decoded picture. For example, an adaptive sampling rate and/or an adaptive sampling pattern may be determined depending on the size of a left block and the size of a right block on the basis of a block boundary. In this case, the adaptive sampling rate and/or the adaptive sampling pattern may be defined by at least one of the number of samples and the interval between samples.

In the embodiment of FIG. 7, if the size of a left block P is the same as that of a right block Q, the adaptive sampling rate and/or the adaptive sampling pattern may be identically applied to the left block P and the right block Q.

Referring to FIG. 7, if the sizes of neighboring blocks on the basis of a block boundary are the same, the number of samples used within the left block P may be the same as that used within the right block Q. Furthermore, the interval between samples used within the left block P may be the same as the interval between samples used within the right block Q.

In the embodiments of FIGS. 8 and 9, if the size of a left block P is not the same as that of a right block Q, the adaptive sampling rate and/or the adaptive sampling pattern may be differently applied to the left block P and the right block Q.

Referring to FIG. 8, if the size of the left block P is larger than that of the right block Q, relative low frequency sampling may be applied to the left block P. In this case, the low frequency sampling may be determined based on complexity estimates of video signal undergoing coding. And, the low frequency sampling may be randomly determined or may be applied based on a relative size of a block.

For example, in FIG. 8, if the size of the left block P is 32×32 and the size of the right block Q is 16×16, the interval between samples of the left block P to be filtered may be twice the interval between samples of the right block Q to be filtered, and the number of samples of the left block P to be filtered and the number of samples of the right block Q to be filtered may be the same, that is, 4.

Referring to FIG. 9, if the size of the left block P is larger than that of the right block Q, relatively reduced sampling may be applied to the left block P. In this case, the reduced sampling may be determined based on complexity estimates of video signal undergoing coding. And, the reduced sampling may be randomly determined or may be applied based on a relative size of a block.

For example, in FIG. 9, if the size of the left block P is 32×32 and the size of the right block Q is 16×16, the number of samples of the left block P to be filtered may be ½ of the number of samples of the right block Q to be filtered, and the interval between the samples of the left block P to be filtered may be four times the interval between the samples of the right block Q to be filtered. That is, the number of samples of the left block P to be filtered may be two, that is, p0 and p2, and the number of samples of the right block Q to be filtered may be four, that is, q0, q1, q2, and q3.

FIG. 10 is a diagram illustrating a method of performing filtering using locally adaptive sampling in accordance with an embodiment to which the present invention is applied.

Referring to FIG. 10, it is assumed that sample positions on the left side are p0, p1, p2, and p3 and sample positions on the right side are q0, q1, q2, and q3 on the basis of a vertical boundary, and d0, d1, d2, d3, d4, and d5 are offset values that replace pixel values placed at corresponding sample positions. For example, in FIG. 10, the offset values d0, d1, and d2 may replace respective pixel values I(p2), I(p1), and I(p0) placed at the sample positions p2, p1, p0 of the left block P, and the offset values d3, d4, and d5 may replace respective pixel values I(q0), I(q1), and I(q2) placed at the sample positions q0, q1, and q2 of the right block Q (1000).

The offset values d0, d1, d2, d3, d4, and d5 may be calculated by applying a finite impulse response (FIR) filter, such as that of Math Figure 1 below.

$$d0=((2*I(p3)+3*I(p2)+I(p1)+I(p0)-I(q0)+4)>>3);$$

$$d1=((I(p2)+I(p2)+I(p3)+I(p4)+2)>>2);$$

$$d2=((I(p2)+2*I(p1)+2*I(p0)+2*I(q0)+I(q1)+4)>>3);$$

$$d3=((I(p1)+2*I(p0)+2*I(q0)+2*I(q1)+I(q2)+4)>>3);$$

$$d4=((I(p0)+I(q0)+I(q1)+I(q2)+2)>>2);$$

$$d5=((I(p0)+I(q0)+I(q1)+3*I(q2)+2*I(q3)+4)>>3);\quad\text{[Math Figure 1]}$$

The finite impulse response (FIR) filter applied in Math Figure 1 is only an embodiment, and the present invention is not limited thereto.

If the offset values d0~d5 are calculated using Math Figure 1, a clipping function, such as that of Math Figure 2, may be applied in order to replace corresponding sample positions p2~p0, q0~q2.

$$I(p2)=\text{Clip3}(A,A',d0);$$

$$I(p1)=\text{Clip3}(B,B',d1);$$

$$I(p0)=\text{Clip3}(C,C',d2);$$

$$I(q0)=\text{Clip3}(D,D',d3);$$

$$I(q1)=\text{Clip3}(E,E',d4);$$

$$I(q2)=\text{Clip3}(F,F',d5);\quad\text{[Math Figure 2]}$$

In this case, A~F and A'~F' are indicative of the upper and lower dynamical range boundaries of the samples p3~q3. That is, the offset values d0~d5 converge within a range that include A and A', B and B', . . . , F and F', respectively. In such a case, the ranges of sample values replaced by filtering are limited to the upper limit values A~F and the lower limit values A'~F'. The upper limit values A~F and the lower limit values A'~F' may be determined based on the quantization parameters of the left block P and the right block Q. For example, if the quantization parameter has a great value, ranges determined by the upper limit values A~F and the lower limit values A'~F' may be increased.

Meanwhile, the sample positions p3~q3 may be determined by relative locations on the basis of the block boundary. For example, the sample positions p3~q3 may be addressed by a relative location for the left-most pixel of the right block Q on the basis of the block boundary. The spatial sample positions p3~q3 may be sequentially identified using the left-most pixel of the right block Q as a reference location.

Assuming a row of a decoded picture is represented as "piSrc", the left-most pixel of the right block Q is given as "piSrc[0]". If an offset indicative of the original pixel grid is 1, the sample positions p3~q3 may be given as follows.

$$p3=piSrc[-\text{Offset}*4];$$

$$p2=piSrc[-\text{Offset}*3];$$

$$p1=piSrc[-\text{Offset}*2];$$

$$p0=piSrc[-\text{Offset}];$$

$$q0=piSrc[0];$$

$$q1=piSrc[\text{Offset}];$$

$$q2=piSrc[\text{Offset}*2];$$

$$q3=piSrc[\text{Offset}*3];\quad\text{[Math Figure 3]}$$

In some embodiments of the present invention, the sample positions p3~q3 may be addressed at a locally adaptive sampling rate. For example, the locally adaptive sampling rate may be performed by scaling the offset value with a rate conversion (RP) value as in Math Figure 4 below.

$$p3=piSrc[-\text{Offset}*RP*4];$$

$$p2=piSrc[-\text{Offset}*RP*3];$$

$$p1=piSrc[-\text{Offset}*RP*2];$$

$$p0=piSrc[-\text{Offset}*RP];$$

$$q0=piSrc[0];$$

$$q1=piSrc[\text{Offset}*RP];$$

$$q2=piSrc[\text{Offset}*RP*2];$$

$$q3=piSrc[\text{Offset}*RP*3];\quad\text{[Math Figure 4]}$$

In Math Figure 4, RP denotes a rate conversion value.

In some embodiments of the present invention, different RP values may be applied to the left block P and the right block Q on the basis of the block boundary. For example, a rate conversion value applied to the left block P may be defined as a RPL (left) scaling factor, and a rate conversion value applied to the right block Q may be defined as an RPR (right) scaling factor. In this case, the sample positions p3~q3 may be given as in Math Figure 5 below.

$$p3=piSrc[-\text{Offset}*RPL*4];$$

$$p2=piSrc[-\text{Offset}*RPL*3];$$

$$p1=piSrc[-\text{Offset}*RPL*2];$$

$p0=piSrc[-\text{Offset}*RPL];$ $q0=piSrc[0];$ $q1=piSrc[\text{Offset}*RPR];$ $q2=piSrc[\text{Offset}*RPR*2];$ $q3=piSrc[\text{Offset}*RPR*3];$ [Math Figure 5]

In accordance with another embodiment of the present invention, a sample position may be additionally refined based on a sub-rate conversion offset value. For example, a sample position may be additionally adjusted precisely by scaling the offset value with a rate conversion value and then adding a sub-rate conversion offset value. In this case, the sample positions p3~q3 may be given as in Math Figure 6 below.

$p3=piSrc[-\text{Offset}*RPL*4+\text{sub}RPL];$ $p2=piSrc[-\text{Offset}*RPL*3+\text{sub}RPL];$ $p1=piSrc[-\text{Offset}*RPL*2+\text{sub}RPL];$ $p0=piSrc[-\text{Offset}*RPL+\text{sub}RPL];$ $q0=piSrc[0+\text{sub}RPR];$ $q1=piSrc[\text{Offset}*RPR+\text{sub}RPR];$ $q2=piSrc[\text{Offset}*RPR*2+\text{sub}RPR];$ $q3=piSrc[\text{Offset}*RPR*3+\text{sub}RPR];$ [Math Figure 6]

In Math Figure 6, "subRPL" is indicative of a sub-rate conversion offset value applied to the left block P, and "subRPR" is indicative of a sub-rate conversion offset value applied to the right block Q.

FIG. 11 illustrates various examples in which a sampling is performed using a rate conversion value and a sub-rate conversion offset value in accordance with an embodiment to which the present invention is applied.

FIG. 11(a) illustrates an example in which RPL=2, subRPL=0, RPR=2, and subRPR=0. That is, the present embodiment corresponds to an example in which all the sub-rate conversion offset values are 0 and the same rate conversion value, that is, 2, has been applied to the left block P and the right block Q.

FIG. 11 (b) illustrates an example in which RPL=2, subRPL=0, RPR=2, and subRPR=1. That is, the present embodiment corresponds to an example in which a sub-rate conversion offset value 1 has been applied to only the right block Q and the same rate conversion value, that is, 2, has been applied to the left block P and the right block Q. When the example of FIG. 11(b) is compared with the example of FIG. 11(a), it may be seen that the locations of all the samples in the right block Q have been shifted to the right by 1 pixel.

FIG. 11(c) illustrates an example in which RPL=1, subRPL=0, RPR=2, and subRPR=1. The present embodiment corresponds to an example in which a rate conversion value and a sub-rate conversion offset value are differently applied to the left block P and the right block Q. That is, a rate conversion value applied to the right block Q is two times a rate conversion value applied to the left block P, and a sub-rate conversion offset value 1 has been applied to only the right block Q. When the example of FIG. 11(c) is compared with the example of FIG. 11(b), it may be seen that the locations of all the samples in the left block P have been shifted to the block boundary by ½.

In yet another embodiment of the present invention, the values RPR, RPL, subRPL, and subRPR or the subset values of them may be determined by the encoder and the decoder from local parameters within spatio-temporally neighboring decoded pictures. For example, the local parameters may include block partitioning, coding modes, motion information, a transform type, decoded picture sample values, and other available priori information.

In yet another embodiment of the present invention, the values RPR, RPL, subRPL, and subRPR or the subset values of them may be determined may be determined by the encoder and the decoder from local parameters within spatio-temporally neighboring decoded pictures. For example, the local parameters may include block partitioning, coding modes, motion information, a transform type, decoded picture sample values, other available priori information, and a signal, such as syntax elements (i.e., a block partitioning level) or side information (e.g., SEI in the case of post-processing).

In some embodiments of the present invention, update values d0~d5 may be applied to decoded picture samples located based on a rate conversion value and a sub-rate conversion offset value as in Math Figure 7 below.

$piSrc[-\text{Offset}*RPL*3+\text{sub}RPL]=d0;$ $piSrc[-\text{Offset}*RPL*2+\text{sub}RPL]=d1;$ $piSrc[-\text{Offset}*RPL+\text{sub}RPL]=d2;$ $piSrc[0+\text{sub}RPL]=d3;$ $piSrc[\text{Offset}*RPL+\text{sub}RPR]=d4;$ $piSrc[\text{Offset}*RPL*2+\text{sub}RPR]=d5;$ [Math Figure 7]

In some embodiments of the present invention, if the value RPL, RPR is greater than 1, samples located at a sub-integer pixel grid may be updated through the interpolation of two nearest update values. For example, if RPL=RPR=2 and linear interpolation is used, Math Figure 8 may be obtained.

$piSrc[-\text{Offset}*RPL*3]=d0;$ $piSrc[-\text{Offset}*RPL*3]=d0;$ $piSrc[-\text{Offset}*RPL*3+1]=(d0+d1)/2;$ $piSrc[-\text{Offset}*RPL*2]=d1;$ $piSrc[-\text{Offset}*RPL*2+1]=(d1+d2)/2;$ $piSrc[-\text{Offset}*RPL]=d2;$ $piSrc[-\text{Offset}*RPL+1]=(3*d2+d3)/4;$ $piSrc[0]=(d2+3*d3)/4;$ $piSrc[0+1]=d3;$ $piSrc[\text{Offset}*RPL]=(d3+d4)/2;$ $piSrc[\text{Offset}*RPL+1]=d4;$ $piSrc[\text{Offset}*RPL*2]=(d4+d5)/2;$ $piSrc[\text{Offset}*RPL*2+1]=d5;$ [Math Figure 8]

In yet another embodiment of the present invention, other interpolation methods may be used to produce the sample values located at a sub-integer pixel grid. Not-limiting examples may include a quadratic, cubic, higher order, spline, transform-based interpolation, non-linear interpolation, and adaptive interpolation method.

The update values d0~d5 as well as the sample values of such samples may be calculated by stretching, interpolation, and extrapolating pulse responses provided by Math Figure 1 and then applying a windowing function to them.

In yet another embodiment of the present invention, an adaptive pulse response function may be derived on the decoder or encoder side through a specified process or may be signaled using syntax elements within a bit stream or side information.

In some embodiments of the present invention, if a great block size is used, in deblocking, an analysis of block border conditions using a sub-sampled version of boundary samples may be performed. Alternatively, deblocking may use filtering of a different tap length in order to incorporate information on the local complexity of a video signal.

In some embodiments of the present invention, interpolation filters having variable sampling rates may be applied depending on the complexity estimates of undergoing coding.

In some embodiments of the present invention, adaptive filters, a Sample-Adaptive Offset (SAO) filter, or transform may be applied with various sampling rates and/or tap lengths/adaptive filter coefficients based on the complexity estimates of undergoing coding.

In another embodiment to which the present invention is applied, the filtering unit 140, 230 may determine a Boundary Strength (BS) value based on at least one of the size, coding mode, and coding parameter of a block that neighbors a block boundary. Whether or not to perform filtering may be determined based on the BS value. For example, in order to determine whether or not to perform filtering, a change of a sample value may be measured based on the samples in the first row (see 310 of FIG. 3) and the samples in the fourth row (see 320 of FIG. 3). In such a case, the locally adaptive sampling method described in this specification may be applied.

In addition, the filtering unit 140, 230 may calculate another variable value using the quantization parameter values of blocks that neighbor the block boundary and determine whether or not to perform filtering based on another variable value. If conditions to which filtering is applied are satisfied, the filtering unit 140, 230 may select a filter type to be applied to the block boundary.

If filtering is performed on horizontal edges, it may be performed in a row unit. Furthermore, filtering may be performed on a specific number of samples on the basis of a block boundary. For example, if strong filtering is performed, three samples within a block may be used. If weak filtering is performed, two samples within a block may be used. Even in such a case, the locally adaptive sampling method described in this specification may be applied.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional (3D) video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves (e.g., transmission through the Internet). Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of performing a deblocking filtering on a video signal, comprising:
checking a size of a left block and a size of a right block on the basis of a block boundary to be filtered;
determining an adaptive sampling rate based on the size of the left block and the size of the right block, wherein the adaptive sampling rate is defined by the number of samples and the interval between samples;
performing the deblocking filtering using samples to which the adaptive sampling rate has been applied; and
in response to the size of the left block being different from the size of the right block based on the block boundary, the adaptive sampling rate is differently applied to the left block and the right block, and low frequency sampling or reduced sampling is applied to a block having a larger size.

2. The method of claim 1,
wherein in response to the size of the left block being identical with the size of the right block based on the block boundary, the adaptive sampling rate is identically applied to the left block and the right block.

3. The method of claim 1,
wherein the samples are addressed by a relative location for a left-most pixel of a right block based on a block boundary.

4. The method of claim 3,
wherein the adaptive sampling rate is determined by scaling an offset value with a rate conversion value.

5. The method of claim 4,
wherein the rate conversion value is differently applied to a left block and the right block based on the block boundary.

6. The method of claim 4, wherein a location of the samples is additionally adjusted based on a sub-rate conversion offset value.

7. The method of claim 1,
wherein a step of performing the deblocking filtering comprises:

determining samples to be filtered based on the adaptive sampling rate;
calculating offset values by applying a finite impulse response (FIR) filter to the samples; and
obtaining filtered sample values by applying a clipping function to the offset values.

8. An apparatus for performing a deblocking filtering on a video signal, comprising:
a picture property checking unit configured to check a size of a left block and a size of a right block on the basis of a block boundary to be filtered;
an adaptive sampling unit configured to determine an adaptive sampling rate based on the size of the left block and the size of the right block, wherein the adaptive sampling rate is defined by the number of samples and the interval between samples; and
a filtering execution unit configured to perform the deblocking filtering using samples to which the adaptive sampling rate has been applied,
wherein in response the size of the left block being different from the size of the right block based on the block boundary, the adaptive sampling rate is differently applied to the left block and the right block, and low frequency sampling or reduced sampling is applied to a block having a larger size.

9. The apparatus of claim 8,
wherein in response the size of the left block being identical with the size of the right block based on the block boundary, the adaptive sampling rate is identically applied to the left block and the right block.

10. The apparatus of claim 8,
wherein the samples are addressed by a relative location for a left-most pixel of a right block based on a block boundary.

11. The apparatus of claim 10,
wherein the adaptive sampling rate is determined by scaling an offset with a rate conversion value.

12. The apparatus of claim 11,
wherein the rate conversion value is differently applied to a left block and the right block based on the block boundary.

13. The apparatus of claim 11,
wherein a location of the samples is additionally adjusted based on a sub-rate conversion offset value.

14. The apparatus of claim 8,
wherein the filtering execution unit is further configured to determine samples to be filtered based on the adaptive sampling rate, calculate offset values by applying a finite impulse response (FIR) filter to the samples, and obtain filtered sample values by applying a clipping function to the offset values.

* * * * *